(12) United States Patent
Paris et al.

(10) Patent No.: US 12,170,702 B2
(45) Date of Patent: Dec. 17, 2024

(54) TWO-WAY DELAY BUDGET FOR INTERACTIVE SERVICES

(71) Applicant: Nokia Technologies Oy, Espoo (FI)

(72) Inventors: Stefano Paris, Vanves (FR); Devaki Chandramouli, Plano, TX (US); Rastin Pries, Augsburg (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/657,084

(22) Filed: Mar. 29, 2022

(65) Prior Publication Data
US 2023/0319125 A1 Oct. 5, 2023

(51) Int. Cl.
*H04L 65/752* (2022.01)
(52) U.S. Cl.
CPC ................. *H04L 65/752* (2022.05)
(58) Field of Classification Search
CPC ........... H04W 72/0446; H04W 72/563; H04W 74/0816; H04W 84/12; H04W 72/23; H04W 76/10; H04W 92/06; H04W 88/08; H04W 16/10; H04W 52/14; H04M 3/00; H04L 65/752; H04L 43/0864; H04L 47/283; H04L 43/16; H04L 43/0858; H04L 43/0852; H04N 21/2408; H04N 21/2402; H04N 21/2343; H04N 21/24
See application file for complete search history.

(56) References Cited

U.S. PATENT DOCUMENTS

| | | | |
|---|---|---|---|
| 7,633,869 B1 * | 12/2009 | Morris | H04L 41/0896 370/468 |
| 2010/0302960 A1 * | 12/2010 | Bjorken | H04L 1/188 370/252 |
| 2015/0373075 A1 * | 12/2015 | Perlman | H04L 65/762 709/217 |
| 2016/0219088 A1 | 7/2016 | Ma et al. | |

(Continued)

OTHER PUBLICATIONS

"3rd Generation Partnership Project; Technical Specification Group Services and System Aspects; System architecture for the 5G System (5GS); Stage 2 (Release 17)", 3GPP TS 23.501, V17.2.0, Sep. 2021, pp. 1-542.

(Continued)

*Primary Examiner* — Schquita D Goodwin
*Assistant Examiner* — Mehulkumar J Shah
(74) *Attorney, Agent, or Firm* — ALSTON & BIRD LLP

(57) ABSTRACT

A method, apparatus, and computer program product are disclosed for modifying the transmission of media content update packets based on a determination that the elapsed uplink time and remaining downlink time in the aggregate are within a satisfactory round-trip delay time. In this regard, the method, apparatus, and computer program product are configured to correlate a returned media content update packet with an associated device update packet or packets. Correlating media content update packets with an associated device update packet may require identifying a returned packet containing a media content update by analyzing packets containing video streams to identify packets comprising reference video frames. Identifying reference video (Continued)

frame packets may assist in identifying the associated uplink packet or packets containing device pose and position or other user input.

22 Claims, 8 Drawing Sheets

(56) References Cited

U.S. PATENT DOCUMENTS

| | | | |
|---|---|---|---|
| 2019/0109678 A1* | 4/2019 | Rollet | H04L 1/1851 |
| 2020/0259896 A1* | 8/2020 | Sachs | H04W 12/04 |
| 2020/0389813 A1 | 12/2020 | Hande et al. | |
| 2021/0105762 A1 | 4/2021 | Pezeshki et al. | |
| 2021/0321286 A1* | 10/2021 | Berliner | H04W 28/0263 |
| 2021/0377866 A1* | 12/2021 | Kim | H04W 52/0251 |
| 2023/0032764 A1* | 2/2023 | Dou | H04L 65/75 |
| 2023/0198663 A1* | 6/2023 | Stoica | H04N 19/89 |
| | | | 714/726 |

OTHER PUBLICATIONS

"Revised SID on XR Evaluations for NR", 3GPP TSG RAN Meeting #88e, RP-201145, Agenda: 9.9.6, Qualcomm, Jun. 29-Jul. 3, 2020, 6 pages.

"3rd Generation Partnership Project; Technical Specification Group Services and System Aspects; Extended Reality (XR) in 5G (Release 16)", 3GPP TR 26.928, V16.1.0, Dec. 2020, 131 pages.

"New asymmetric standardized 5QI values for Advanced Interactive Services", SA WG2 Meeting #143E e-meeting, 62-2100752, Qualcomm Incorporated, Feb. 24-Mar. 9, 2021, pp. 1-7.

"New standardized 5QI values and reuse of existing 5Q1 values for Advanced Interactive Services", SA WG2 Meeting #143E e-meeting, S2-2100751, Qualcomm Incorporated, Feb. 24-Mar. 9, 2021, pp. 1-5.

"New 5QI values to support Advance Interactive Services (AIS) in 5G", 3GPP TSG-TSA2 Meeting # 143E, 62-2100315, Ericsson, Feb. 24-Mar. 9, 2021, pp. 1-7.

"eXtended Reality (XR)", Ofinno, Dec. 2020, 9 pages.

"5G; Extended Reality (XR) in 5G (3GPP TR 26.928 version 16.1.0 Release 16)", ETSI TR 126 928, V16.1.0, Jan. 2021, 133 pages.

Bai et al., "Towards Delay-Optimal Multi-Connectivity Traffic Management for Edge Networks", IEEE 94th Vehicular Technology Conference (VTC2021-Fall), Sep. 27-30, 2021, 6 pages.

Extended European Search Report for European Application No. 23164544.1 dated Aug. 25, 2023, 10 pages.

"3rd Generation Partnership Project; Technical Specification Group Services and System Aspects; Study on XR (Extended Reality) and Media Services (Release 18)", 3GPP TR 23.700-60 v0.1.0, (Feb. 2022), 15 pages.

"3rd Generation Partnership Project; Technical Specification Group Services and System Aspects; System Architecture for the 5G System (5GS); Stage 2 (Release 17)", 3GPP TS 23.501 v17.4.0, (Mar. 2022), 567 pages.

* cited by examiner

TWO-WAY DELAY BUDGET FOR INTERACTIVE SERVICES

TECHNOLOGICAL FIELD

An example embodiment of the present disclosure relates generally to methods, apparatus, and computer program products for implementing a two-way delay budget and, more particularly, but not exclusively, to recognizing a transmitted change in position of an interactive device and modifying the content update transmission based on the elapsed and expected transmission times.

BACKGROUND

Interactive services are some of the most important media applications to utilize next generation or fifth generation (5G) technology. In general, the data sent from interactive applications and the data received from a responding content server are mutually dependent. Creating a positive user experience on an interactive device is strongly dependent on providing updated content in response to device pose/position data and/or user input with minimal delay. In a typical interactive service utilizing a 5G network, user equipment (UE) sends position and pose information, or other user provided input, across the 5G network to a content server. The content server responds to the received UE update data by sending updated media content across the 5G network and to the UE. Reception of updated media content at the UE with minimal round trip delay provides a seamless transition to the new media content.

One such example of mutually dependent data is the viewport-dependent streaming of eXtended Reality (XR) devices. XR refers to all real-and-virtual combined environments and associated human-machine interaction generated by computer technology and wearables. XR includes representative forms such as augmented reality (AR), mixed reality (MR), virtual reality (VR), and the areas interpolated among them. Many of these devices require video content streams dependent upon the position and pose of the viewport to provide an immersive environment. The transmission of new XR video content can be triggered by head and user movements, and/or the need to transmit a subsequent portion of a three-dimensional (3D) video. Once all tiles in the field of view (FOV) are updated, the video content can be rendered in a 3D representation that is displayed to the user. Long delays in returning the associated 3D video content can lead to non-viewport streaming included in the delivered content; a waste of bandwidth due to transmitting more content than necessary to compensate for delays; displacement of content in the user's perspective view; and incomplete virtual objects.

BRIEF SUMMARY

A method, apparatus, and computer program product are disclosed for modifying the transmission of media content update packets based on a determination that the elapsed uplink time and remaining downlink time in the aggregate are within a satisfactory round-trip delay time. In this regard, the method, apparatus, and computer program product are configured to correlate a returned media content update packet with an associated device update packet or packets. In some embodiments, identifying a returned packet containing a content update may include analyzing packets containing video streams to identify packets comprising reference video frames. In some embodiments, identifying reference video frame packets will assist in identifying the associated uplink packet or packets containing device pose and position or other user input.

In an embodiment, a method is provided. The method includes determining a plurality of device update packets associated with a new media content transmission packet. The method also includes determining an estimated elapsed uplink transmission time based on respective transmit times for the plurality of device update packets. The method also includes determining an estimated remaining downlink transmission time based on an estimate of the time required to transmit the new media content transmission packet to an interactive device. The method further includes comparing the estimated elapsed uplink transmission time and the estimated remaining downlink transmission time with a pre-defined two-way delay budget. The method also includes modifying transmission of the new media content transmission packet based on the comparison.

In some embodiments of the method, the new media content transmission packet comprises a compressed video stream comprising reference video frames and non-reference video frames and wherein identifying the new media content transmission packet further comprises identifying a reference video frame.

In some embodiments of the method, determining the plurality of device update packets associated with the new media content transmission packet further comprises identifying all device update packets received after a most recent non-reference video frame was received and before the reference video frame.

In some embodiments of the method, determining the estimated elapsed uplink transmission time further comprises determining an elapsed uplink transmission time for respective device update packets of the plurality of device update packets and defining the estimated elapsed uplink transmission time based on the maximum elapsed uplink transmission time for respective device update packets of the plurality of device update packets.

In some embodiments of the method, determining the estimated elapsed uplink transmission time further comprises determining a function of respective elapsed uplink transmission times for the plurality of device update packets. In some embodiments of the method, determining a function of respective elapsed uplink transmission times for the plurality of device update packets comprises computing the average or the upper bound of the confidence interval of respective elapsed uplink transmission times for the plurality of device update packets.

In some embodiments of the method, determining an estimated remaining downlink transmission time further comprises determining a sum of a queueing time and an estimated transmission latency of the new media content transmission packet.

In some embodiments the method further comprises determining whether the pre-defined two-way delay budget will be utilized to modify transmission of the new media content transmission packet.

In some embodiments of the method, modifying transmission of the new media content transmission packet further comprises discarding the new media content transmission packet.

In another embodiment, an apparatus is provided. The apparatus includes at least one processor and at least one memory comprising computer program code, wherein the at least one memory and the computer program code are configured to, with the at least one processor, cause the apparatus to determine a plurality of device update packets associated with a new media content transmission packet. The at least one memory and the computer program code are also configured to, with the at least one processor, cause the apparatus to determine an estimated elapsed uplink transmission time based on respective transmit times for the plurality of device update packets. Further, the at least one memory and the computer program code are also configured to, with the at least one processor, cause the apparatus to determine an estimated remaining downlink transmission time based on an estimate of the time required to transmit the new media content transmission packet to an interactive device. In addition, the at least one memory and the computer program code are also configured to, with the at least one processor, cause the apparatus to compare the estimated elapsed uplink transmission time and the estimated remaining downlink transmission time with a pre-defined two-way delay budget. Further, the at least one memory and the computer program code are also configured to, with the at least one processor, cause the apparatus to modify transmission of the new media content transmission packet based on the comparison.

In some embodiments of the apparatus, the new media content transmission packet comprises a compressed video stream comprising reference video frames and non-reference video frames and wherein the apparatus is caused to identify the new media content transmission packet by identifying a reference video frame.

In some embodiments of the apparatus, the apparatus is caused to determine the plurality of device update packets associated with the new media content transmission packet by identifying all device update packets received after a most recent non-reference video frame was received and before the reference video frame.

In some embodiments of the apparatus, the apparatus is caused to determine the estimated elapsed uplink transmission time by determining an elapsed uplink transmission time for respective device update packets of the plurality of device update packets and defining the estimated elapsed uplink transmission time based on the maximum elapsed uplink transmission time for respective device update packets of the plurality of device update packets.

In some embodiments of the apparatus, the apparatus is caused to determine the estimated elapsed uplink transmission time by determining an average of a confidence interval of respective elapsed uplink transmission times for the plurality of device update packets.

In some embodiments of the apparatus, the apparatus is caused to determine an estimated remaining downlink transmission time by determining a sum of a queueing time and an estimated transmission latency of the new media content transmission packet.

In another embodiment, a computer program product is provided that includes non-transitory computer readable storage medium having program code portions stored thereon, the program code portions configured, upon execution, to determine a plurality of device update packets associated with a new media content transmission packet. The program code portions further configured, upon execution, to determine an estimated elapsed uplink transmission time based on respective transmit times for the plurality of device update packets. The program code portions are also configured, upon execution, to determine an estimated remaining downlink transmission time based on an estimate of the time required to transmit the new media content transmission packet to an interactive device. In addition, the program code portions are further configured to, upon execution, compare the estimated elapsed uplink transmission time and the estimated remaining downlink transmission time with a pre-defined two-way delay budget. Further, the program code instructions are also configured to, upon execution, modify transmission of the new media content transmission packet based on the comparison.

In some embodiments of the computer program product, the new media content transmission packet comprises a compressed video stream comprising reference video frames and non-reference video frames and wherein the program code portions configured to identify the new media content transmission packet further comprise program code portions configured to identify a reference video frame.

In some embodiments of the computer program product, the program code portions configured to determine the plurality of device update packets associated with the new media content transmission packet further comprise program code portions configured to identify all device update packets received after a most recent non-reference video frame was received and before the reference video frame.

In some embodiments of the computer program product, the program code portions configured to determine the estimated elapsed uplink transmission time further comprise program code portions configured to determine an elapsed uplink transmission time for each of the device update packets in the plurality of device update packets and program code portions configured to define the estimated elapsed uplink transmission time based on the maximum elapsed uplink transmission time for respective device update packets of the plurality of device update packets.

In some embodiments of the computer program product, the program code portions configured to determine the estimated elapsed uplink transmission time further comprise program code portions configured to determine an average of a confidence interval of respective elapsed uplink transmission times for the plurality of device update packets.

In some embodiments of the computer program product, the program code portions configured to determine an estimated remaining downlink transmission time further comprise program code portions configured to determine a sum of a queueing time and an estimated transmission latency of the new media content transmission packet.

In an embodiment, an apparatus is provided that includes means for determining a plurality of device update packets associated with a new media content transmission packet. The apparatus also includes means for determining an estimated elapsed uplink transmission time based on respective transmit times for the plurality of device update packets. The apparatus also includes means for determining an estimated remaining downlink transmission time based on an estimate of the time required to transmit the new media content transmission packet to an interactive device. The apparatus further includes means for comparing the estimated elapsed uplink transmission time and the estimated remaining downlink transmission time with a pre-defined two-way delay budget. The apparatus also includes means for modifying transmission of the new media content transmission packet based on the comparison.

In some embodiments of the apparatus, the new media content transmission packet comprises a compressed video stream comprising reference video frames and non-reference video frames. In this embodiment, the means for identifying the new media content transmission packet further includes means for identifying a reference video frame.

In some embodiments of the apparatus, the means for determining the plurality of device update packets associated with the new media content transmission packet further includes means for identifying all device update packets received after a most recent non-reference video frame was received and before the reference video frame.

In some embodiments of the apparatus, the means for determining the estimated elapsed uplink transmission time further includes means for determining an elapsed uplink transmission time for respective device update packets of the plurality of device update packets and means for defining the estimated elapsed uplink transmission time based on the maximum elapsed uplink transmission time for respective device update packets of the plurality of device update packets.

In some embodiments of the apparatus, the means for determining the estimated elapsed uplink transmission time further includes means for determining a function of respective elapsed uplink transmission times for the plurality of device update packets. In some embodiments of the apparatus, the means for determining a function of respective elapsed uplink transmission times for the plurality of device update packets includes means for computing the average or the upper bound of the confidence interval of respective elapsed uplink transmission times for the plurality of device update packets.

In some embodiments of the apparatus, the means for determining an estimated remaining downlink transmission time further includes means for determining a sum of a queueing time and an estimated transmission latency of the new media content transmission packet.

In some embodiments. the apparatus further includes means for determining whether the pre-defined two-way delay budget will be utilized to modify transmission of the new media content transmission packet. In some embodiments of the apparatus, the means for modifying transmission of the new media content transmission packet further includes means for discarding the new media content transmission packet.

In another embodiment, an apparatus, such as may be embodied by user equipment, is provided. The apparatus includes at least one processor and at least one memory including computer program code with the at least one memory and the computer program code being configured to, with the at least one processor, cause the apparatus to transmit a device update packet requiring transmission of new media content. The at least one memory and the computer program code are also configured to, with the at least one processor, cause the apparatus to receive a new media content transmission packet in conformance with a pre-defined two-way delay budget.

In another embodiment, a method is provided that includes transmitting a device update packet requiring transmission of new media content. The method also includes receiving a new media content transmission packet in conformance with a pre-defined two-way delay budget.

In a further embodiment, a computer program product is provided that includes non-transitory computer readable storage medium having program code portions stored thereon with the program code portions being configured, upon execution, to transmit a device update packet requiring transmission of new media content. The program code portions are also configured to receive a new media content transmission packet in conformance with a pre-defined two-way delay budget.

In another embodiment, an apparatus, such as may be embodied by user equipment, is provided that includes means for transmitting a device update packet requiring transmission of new media content. The apparatus also includes means for receiving a new media content transmission packet in conformance with a pre-defined two-way delay budget.

BRIEF DESCRIPTION OF THE DRAWINGS

Figure 1:
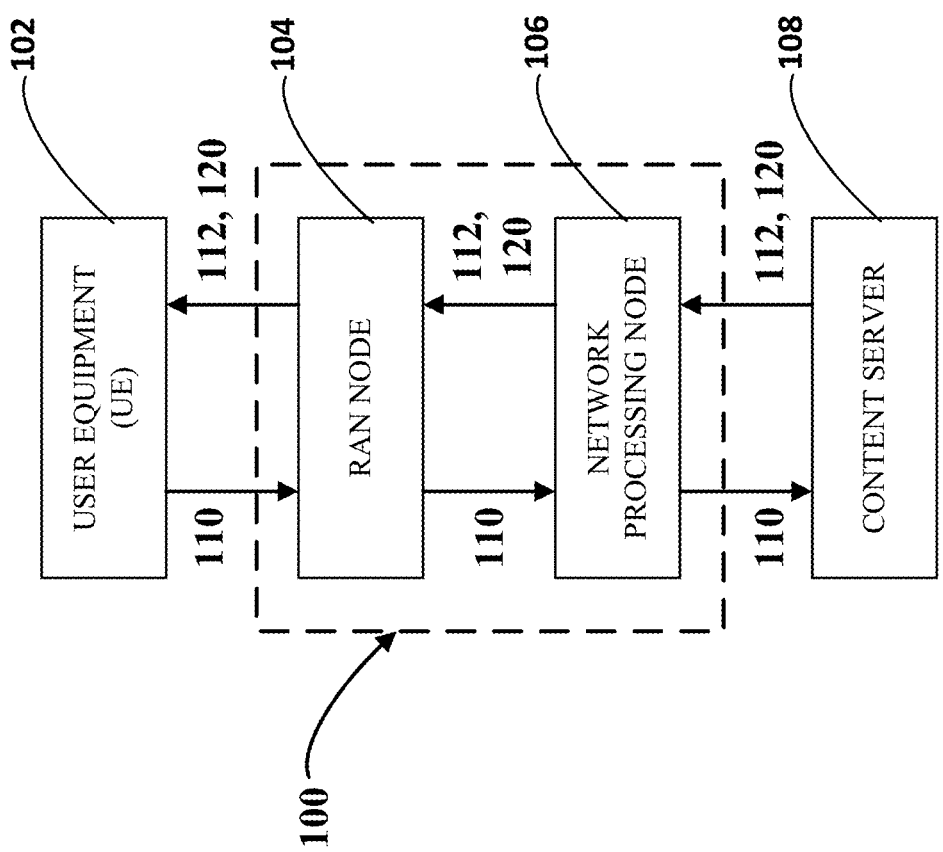
Figure 2:
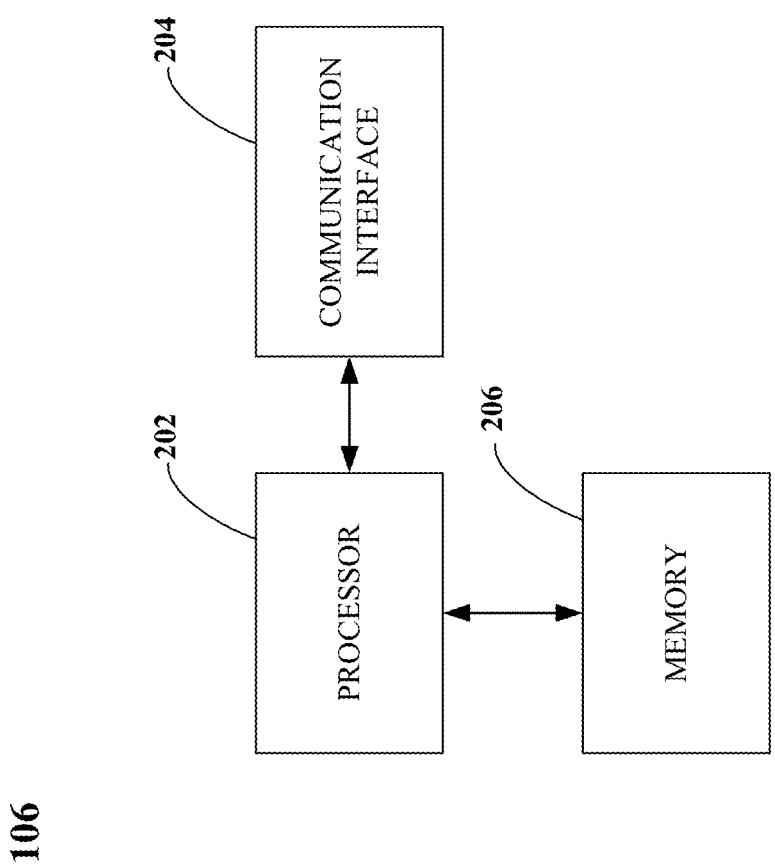
Figure 3:
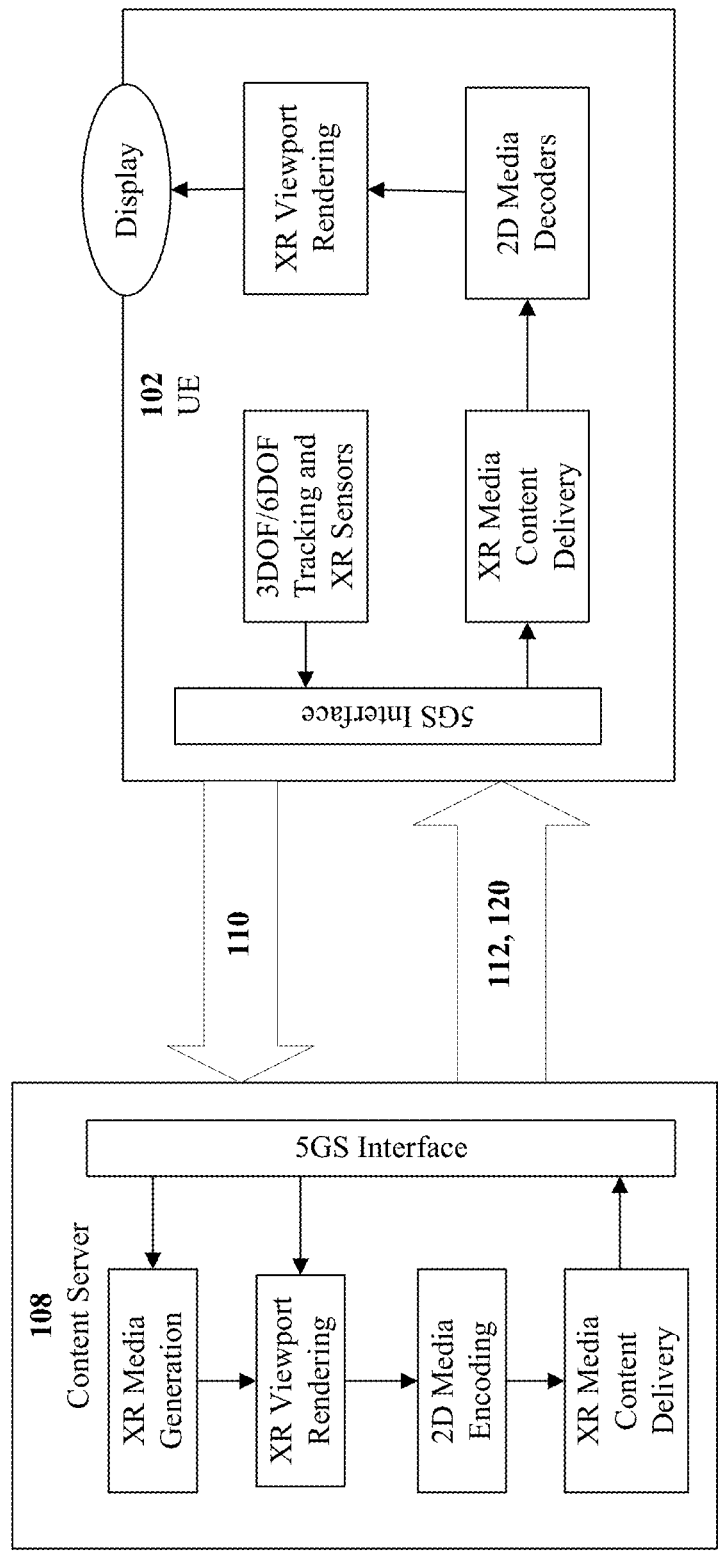
Figure 4:
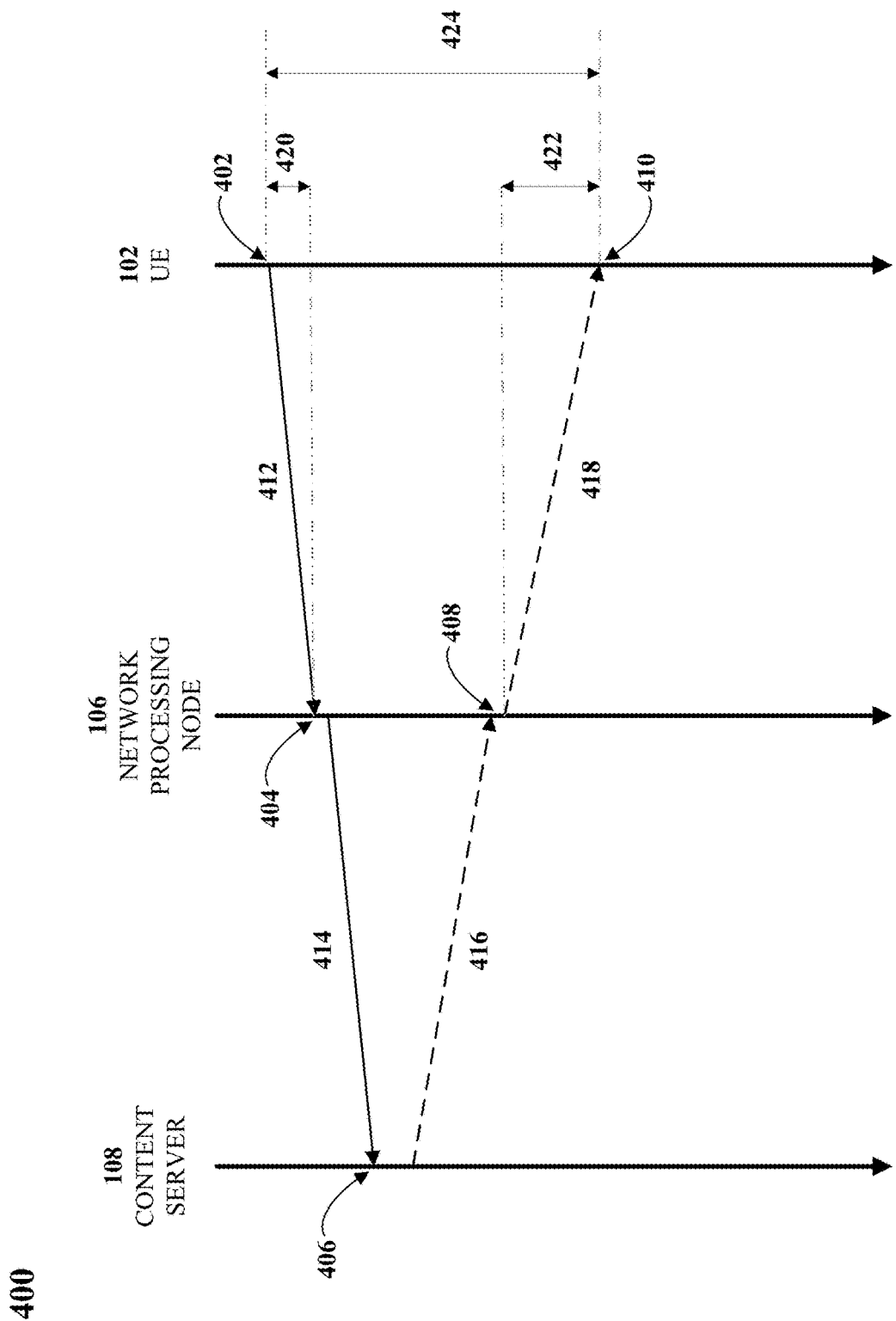
Figure 5:
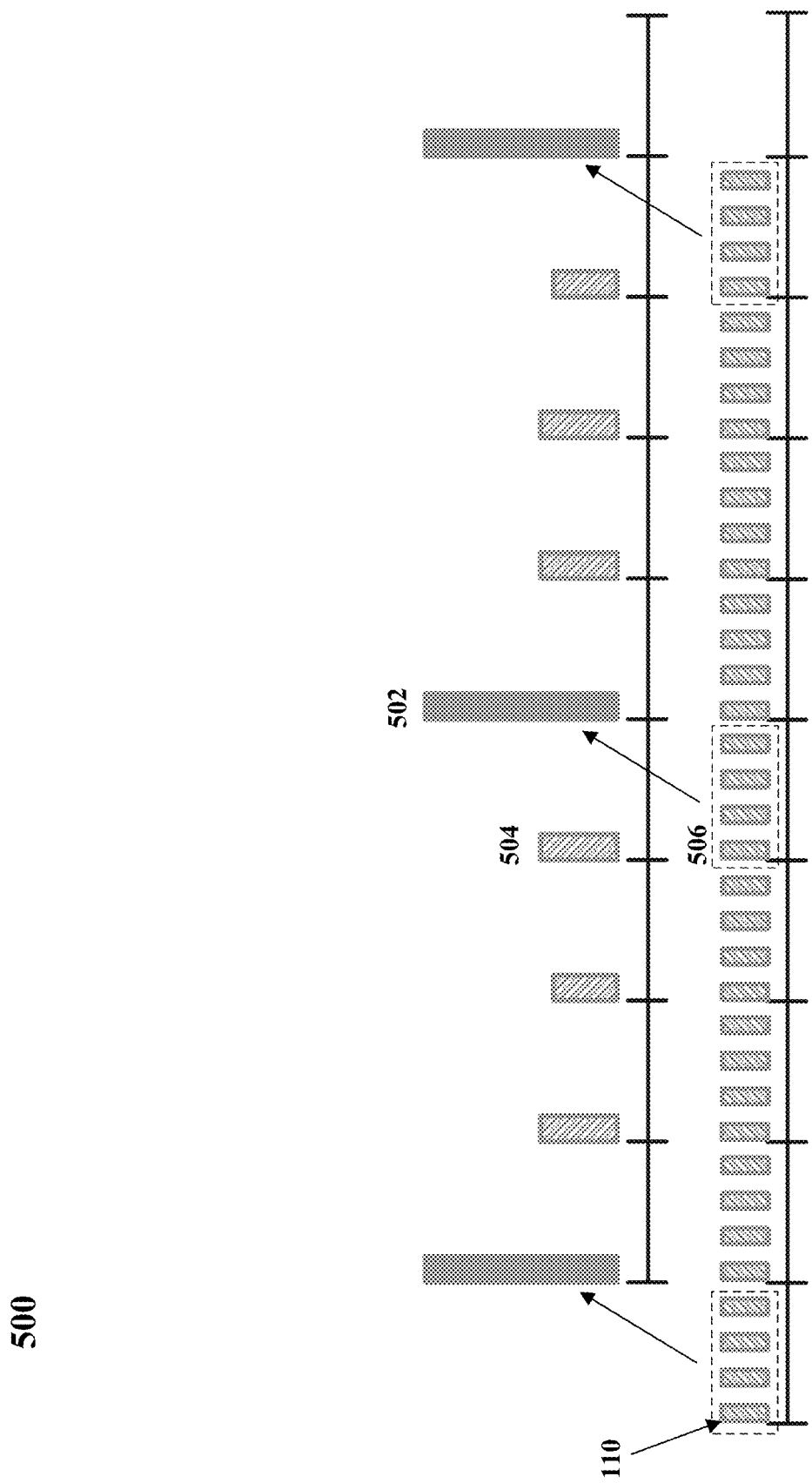
Figure 6:
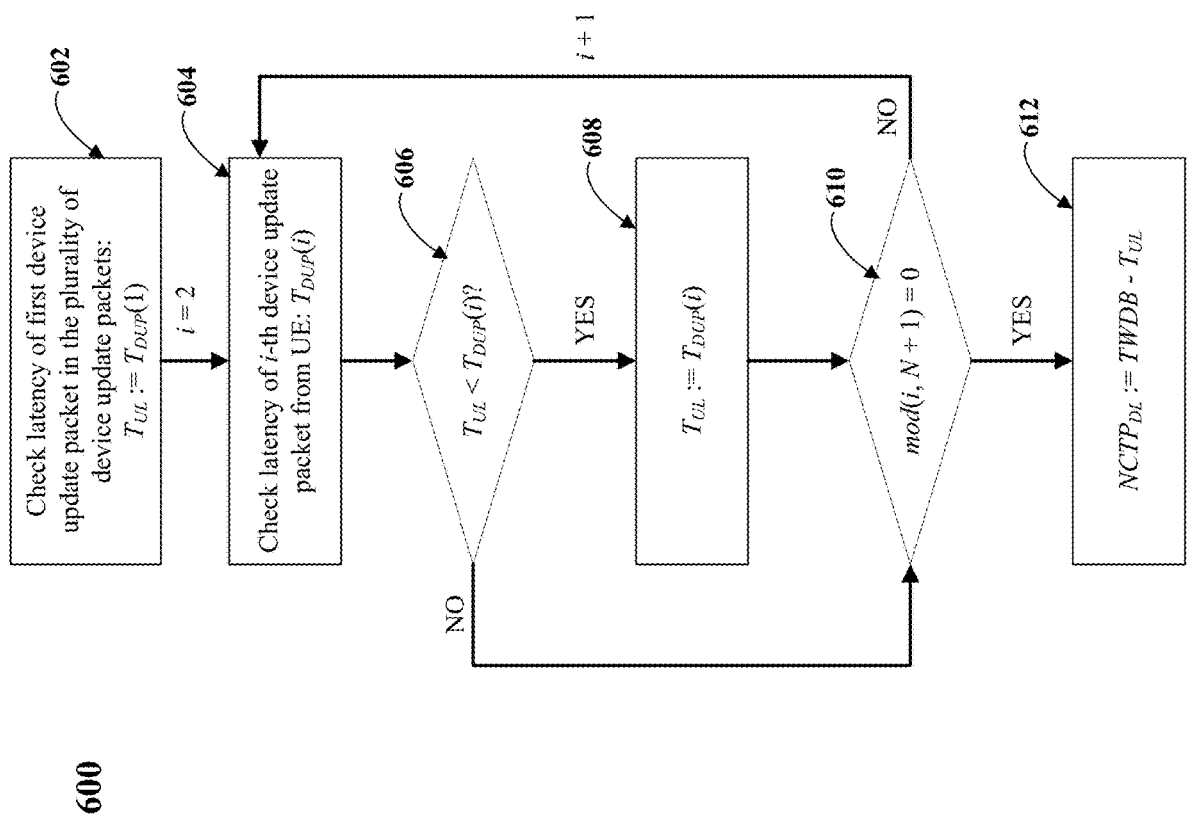
Figure 7:
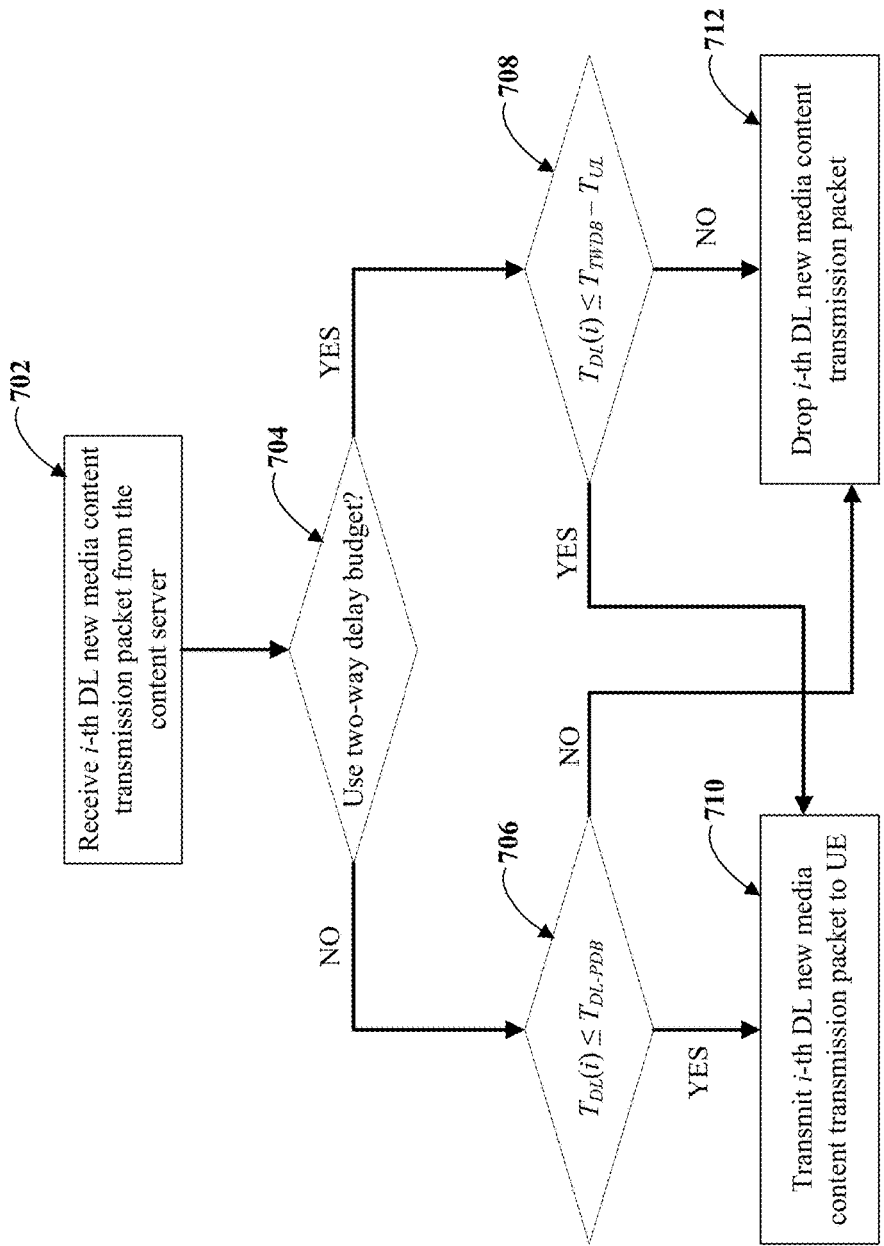
Figure 8:
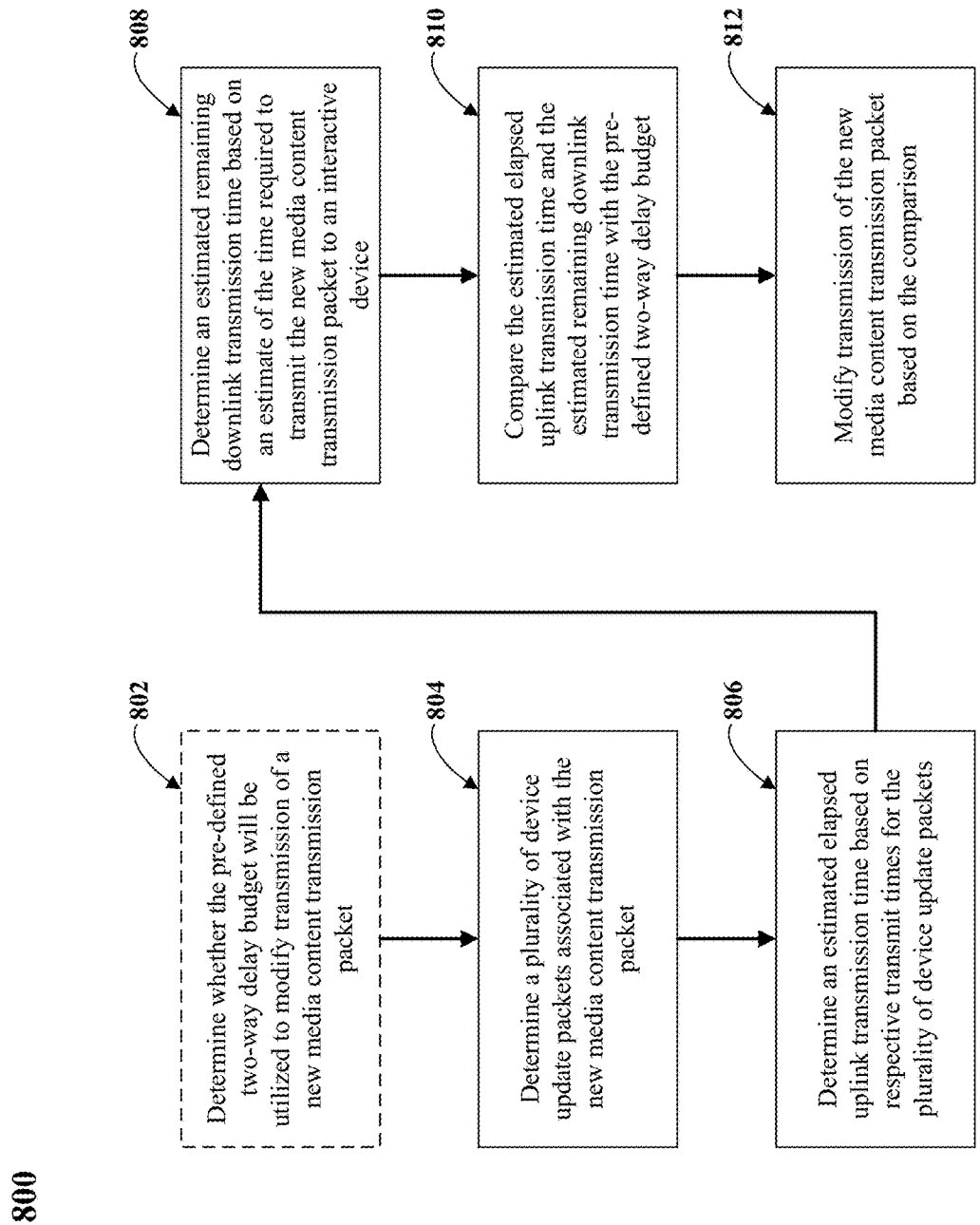

Having thus described certain example embodiments of the present disclosure in general terms, reference will hereinafter be made to the accompanying drawings, which are not necessarily drawn to scale, and wherein:

FIG. 1 illustrates a block diagram of a system including user equipment (UE), a radio access network (RAN) node, a network processing node, and a content server configured to communicate via a network in accordance with an example embodiment of the present disclosure;

FIG. 2 illustrates a block diagram of an apparatus that may be specifically configured in accordance with an example embodiment of the present disclosure;

FIG. 3 illustrates a block diagram of a UE communicating with a content server in accordance with an example embodiment of the present disclosure;

FIG. 4 illustrates a message flow for sending a device update packet and receiving the associated media content update packet in accordance with an example embodiment of the present disclosure;

FIG. 5 illustrates an example data stream illustrating a plurality of device packets associated with a media content update packet in accordance with an example embodiment of the present disclosure;

FIG. 6 illustrates a flow diagram for determining the downlink time available for a media content update packet in accordance with an example embodiment of the present disclosure;

FIG. 7 illustrates a flow diagram for modifying transmission content based after determining whether to use a two-way delay budget in accordance with an example embodiment of the present disclosure; and FIG. 8 illustrates a flow diagram for modifying transmission content based on the comparison of the elapsed uplink time and the estimated remaining time to a pre-defined two-way delay budget in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device. Additionally, as used herein, the term 'module' refers to hardware or a combination of hardware and software in which the execution of the software directs operation of the hardware.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Overview

As described above, interactive services are media applications, some of which will utilize next generation or fifth generation (5G) technology. In some embodiments, interactive services may consist of XR applications such as augmented reality or virtual reality. In other embodiments, interactive service may consist of gaming environments requiring feedback to user input. An interactive services user experience is affected by the Round Trip Delay (RTD), which is measured as the difference between the transmission of the pose/control information and the reception of the corresponding media content. RTD is desirably maintained below a certain threshold in order to give the user of an interactive service the impression of presence and immersion.

Given the specific characteristics of interactive services, the Third Generation Partnership Project (3GPP) defines Quality of Service (QoS) parameters and characteristics for these services. The Fifth Generation (5G) QoS model as defined in 3GPP TS 23.501 is based on QoS Flows, where the QoS Flow is the finest granularity of QoS differentiation in a Protocol Data Unit (PDU) session. A QoS Flow Identifier (QFI) is used to identify a QoS Flow in a 5G system. Each QoS Flow is assigned a certain 5G QoS Identifier (5QI) that maps to QoS characteristics.

In general, updating media content in an immersive system consists of two primary tasks, transmitting pose/control information from the user equipment (UE) across a network (e.g., a 5G network) to the content server by way of a network connection (uplink transmission or "UL") and transmitting the corresponding media content from the content server to the UE across the network by way of the network connection (downlink transmission or "DL"). As currently defined, the 5G QoS characteristics that are defined for each 5QI are distinct for UL traffic and DL traffic. These characteristics include a Packet Delay Budget (PDB) which defines an upper bound for the time that a packet may be in-flight between the UE and the content server. This 5G QoS standard defines the PDB separately for the time delay of transmission from the UE to the content server (uplink) and the time delay of transmission from the content server to the UE (downlink). Having distinct QoS characteristics and parameters for the UL and DL may be too restrictive for interactive devices, since the interactive quality is affected by RTD instead of the delay in one direction.

For example, consider a UL QoS flow carrying pose information and a DL QoS flow containing associated video content. Suppose both the UL transmission and the DL transmission have been assigned the same PDB of 10 milliseconds. Now suppose the UL transmission experiences a transmission delay of only 5 milliseconds related, at least in part, to the fact that the pose information is of minimal size. Further suppose the heftier DL transmission of video content experiences a transmission delay of 12 milliseconds. If only the one-way delay is considered, the DL transmission exceeds the maximum one-way delay threshold for the downlink and is considered lost, even though the RTD is only 17 milliseconds which is within a reasonable threshold for an interactive system.

The determination of compliance with an RTD is made more difficult by the fact that current network processing nodes 106 are incapable of associating DL packets containing updated content with the UL packet of pose/control information that triggered the update of content.

As such, it may be beneficial to correlate the DL packets containing updated content to the associated UL packet of pose/control information that triggered the update of content. Correlating the UL and DL packets enables a network processing node 106 to determine the total transmission delay from the time of the transmission of the UL packet containing updated pose/control information. Determining the total transmission delay may allow a network processing node 106 to modify the transmission of content packets based on a round trip delay parameter specified for interactive services. Such functionality will provide greater flexibility for interactive services in generating a quality user experience when using an interactive system.

System Architecture

FIG. 1 illustrates a communication network 100, such as a 5G network, within which certain illustrative embodiments are to be implemented. However, it is to be appreciated that embodiments are not limited to the network configurations illustrated herein or otherwise described below. It is to be understood that the elements shown in communication network 100 are intended to represent various functions provided within the system. As such, the blocks shown in FIG. 1 reference specific elements in 5G networks that provide the functions. However, other network elements may be used to implement some or all of the functions represented. Also, it is to be understood that not all functions of a 5G network are depicted in FIG. 1. Rather, functions that facilitate an explanation of illustrative embodiments are represented.

A UE 102 is communicatively connected to a RAN node 104. The RAN node 104 is further communicatively connected to a network processing node 106 which is in turn communicatively connected to a content server 108. As shown, the RAN node 104 and the network processing node 106 are components of the communication network 100. The UE 102 may be configured to transmit device update packets 110 to the content server 108 by way of the RAN node 104 and network processing node 106. Further, the UE 102 may be configured to receive media content update packets 112 from the content server 108 by way of the RAN node 104 and network processing node 106, including new media content transmission packets 120.

FIG. 1 depicts a communication network 100. By way of example, the communication network 100 may be deployed within a radio access architecture. However, the system may be deployed in other applications including within other communication networks including, for example, long term evolution advanced (LTE Advanced, LTE-A), a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. Any access network eligible to access the 5G core network such as an Un-trusted Non 3GPP access terminated at a Non-3GPP interworking function (N3IWF), a trusted Non-3GPP access terminated at a trusted non-3GPP gateway function (TNGF) or a Wireline access terminated at a wireless access gateway function (W-AGF) may be used instead of the NG RAN/gNB.

FIG. 1 depicts a UE 102. As shown, a communication network 100 comprises one or more UEs 102 that communicate, such as via an air interface, with a RAN node 104. The UE 102 may be a mobile station, and such a mobile station may comprise, by way of example, a head-mounted display, camera, omnidirectional video device, virtual reality system, augmented reality system, video playback device and/or the like. A UE 102 may be configured to communicate pose and position data, as well as user input in device update packets 110 to a content server 108 by way of a RAN node 104 and a network processing node 106. The pose/position data and user input may be capable of communicating the current status of the UE 102, including physical coordinates as well as changes in yaw, pitch, roll, and/or similar data.

The term "user equipment" as used herein is intended to be construed broadly, so as to encompass a variety of different types of mobile stations, subscriber stations or, more generally, communication devices. In addition to or instead of those identified above, the UE 102 may also refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. The UE 102 may also be called a subscriber unit, mobile station, remote terminal, access terminal, user terminal or user device just to mention but a few apparatuses.

FIG. 1 further depicts a RAN node 104 communicatively connected to a UE 102 and further communicatively connected to a network processing node 106. In the radio access architecture of FIG. 1, UE 102 is configured to be in a wireless connection on one or more communication channels in a cell with a RAN node 104, such as a next generation Node B (gNB). The link from a UE 102 to a gNB is called the uplink or reverse link and the link from the gNB to the UE 102 is called the downlink or forward link. It should be appreciated that the gNBs or their functionalities may be implemented by using any node, host, server, access point (AP), or other entity suitable for such a usage.

A communication network 100 typically comprises more than one gNB, in which case the gNBs may also be configured to communicate with one another over links, wired or wireless, designed for that purpose. The gNB may also be referred to as a base station, an access point or any other type of interfacing device including a relay station capable of operating in a wireless environment. The gNB includes or is coupled to transceiver(s). From the transceivers of the gNB, a connection is provided to an antenna unit that establishes bi-directional radio links to the UE 102. As such, the transceivers of the gNB and the transceivers of the UE 102 may include transmitters and receivers configured to communicate via a channel.

FIG. 1 further depicts a network processing node 106 communicatively connected to a RAN node 104 and further communicatively connected to a content server 108. The network processing node 106 may be used for various network tasks such as registration management, connection management, reachability management, mobility management, and/or other various functions relating to security and access management and authorization. The network processing node 106 may further include features such as a session management function (SMF) module. The SMF module may be used for various responsibilities such as, but not limited to, creating, updating, and/or removing Protocol Data Unit (PDU) sessions and managing session context with the User Plane Function (UPF) of the network. The SMF may also use the non-access stratum (NAS), a functional layer used to manage the establishment of communication sessions and to maintain continuous communications with UE 102, in order to inform the user device of changes in QoS parameters which the RAN node 104 may be currently fulfilling.

In addition, the network processing node 106 may be further configured to identify the transmission of new media content transmission packets 120 from among a series of media content update packets 112 as further described in FIG. 8. In some embodiments, the network processing node 106 may identify a plurality of device update packets 506 based on the identification of a new media content transmission packet 120. This process is similarly described in more detail in FIG. 8. Finally, in some embodiments, the network processing node 106 may modify the transmission of a new media content transmission packet 120 based on a comparison with a two-way delay budget, which is described in more detail in FIG. 7 and FIG. 8.

FIG. 1 further depicts a content server 108 communicatively connected to a network processing node 106. A content server 108 may be configured to receive device update packets 110 and generate media content update packet 112. The transmission of a new media content transmission packet 120 may be triggered by a device update packet 110 containing positional/pose updates and/or user input captured by the UE 102. To minimize bitrate of the content stream provided to the UE 102, only portions of content visible to the user are provided. For this reason, a change in pose or position of an interactive UE 102 or captured user input may trigger the reveal of new content requiring transmission of a new media content transmission packet 120. In addition, in some embodiments, user input may trigger the streaming of new content as communicated by a media content update packet 112.

FIG. 1 further depicts device update packets 110. Device update packets 110 are transmitted from the UE 102 to the content server 108 by way of the RAN node 104 and network processing node 106. In some embodiments, device update packets 110 may include pose and position data of the UE 102. In some embodiments, device update packets 110 may contain user input captured by the UE 102. Pose and position data may include degrees of freedom data associated with the UE 102, such as six degrees of freedom (6DOF) data and/or three degrees of freedom data (3DOF). Pose and position data may also include positional coordinates of the UE 102 such as x,y,z coordinates on an established plane, global positioning system (GPS) coordinates of the UE 102, and/or other sensor data communicated by the UE 102. User input may include input from game controllers, button press captures, motion sensors, and/or other similar input generated by a user, for example, in a gaming environment.

FIG. 1 further depicts a media content update packet 112. A media content update packet 112 may be generated by a content server 108 in response to receipt of device update packets 110. A media content update packet 112 may include video, audio, graphic, and/or other media content presented on the UE 102. In some embodiments, a media content update packet 112 may comprise data streams presented to an XR device. The corresponding data traffic of such data streams may contain large amounts of data when compared with device update packets 110. Such traffic may be due to, for example, a three-dimensional video generation process that creates a sequence of frames at a given sampling rate. In some embodiments, a content server 108 may implement compression algorithms to reduce the amount of traffic communicated using media content update packets 112. Compression of the generated frames may be achieved through a mix of reference and non-reference frames obtained using intra-frame and inter-frame coding techniques. Intra-frame coding may use lossy coding techniques that require only the information carried in the compressed frame for decoding. In contrast, inter-frame coding applies differential techniques across multiple reference frames to encode and transmits only the differences across consecutive frames.

Frames generated using intra-frame coding are termed reference frames while frames generated using inter-frame coding are termed non-reference frames, depending on the differential technique used. Inter-frame coding allows for higher compression at the cost of creating dependencies across frames. In some embodiments, reference frames may include I-frames, while reference and non-reference frames may include P-frames and B-frames. To limit the long dependencies and increase reliability against transmission losses, frames are organized into a Group of Pictures (GoP). A GoP may comprise a sequence of consecutive frames, typically starting with an I-frame and followed by a certain number of P frames or B frames. Such GoP organization creates a bursty traffic pattern with a large burst due to the I-frames followed by smaller bursts carrying P-frames and/or B-frames. In some embodiments, GoP transmissions may be triggered by a change in pose or position of a UE 102 or through user input captured on a UE 102 and transmitted to the content server 108 as device update packets 110 because the rendering of new visible space requires a refresh of the input of the video decoding algorithm.

FIG. 1 further depicts a new media content transmission packet 120. A new media content transmission packet 120 can be any media content update packet 112 generated in response to a device update packet 110 requiring new content as part of an interactive system. In some embodiments, a device update packet 110 may contain a change in pose or position, or may contain some other input requiring transmission of new content. In some embodiments, the new content may require transmission of a GoP, typically starting with an I-frame. A new media content transmission packet 120 may be transmitted in response to such a request for new content.

One example of a network processing node 106 that may be configured to function as a network entity is depicted in FIG. 2. As shown in FIG. 2, the network processing node 106 is an apparatus that includes, is associated with or is in communication with a processor 202, a memory 206, and a communication interface 204. The processor 202 may be in communication with the memory 206 via a bus for passing information among components of the apparatus network processing node 106. The memory 206 may be non-transitory and may include, for example, one or more volatile and/or non-volatile memories. In other words, for example, the memory 206 may be an electronic storage device (e.g., a computer readable storage medium) comprising gates configured to store data (e.g., bits) that may be retrievable by a machine (e.g., a computing device like the processing circuitry). The memory 206 may be configured to store information, data, content, applications, instructions, or the like for enabling the apparatus to carry out various functions in accordance with an example embodiment of the present disclosure. For example, the memory 206 could be configured to buffer input data for processing by the processor 202. Additionally or alternatively, the memory device 206 could be configured to store instructions for execution by the processor 202.

The apparatus network processing node 106 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processor 202 may be configured to execute instructions stored in the memory 206 or otherwise accessible to the processor 202. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processor 202 is embodied as an executor of instructions, the instructions may specifically configure the processor to perform the algorithms and/or operations described herein when the instructions are executed. However, in some cases, the processor 202 may be a processor of a specific device (e.g., an image or video processing system) configured to employ an embodiment of the present invention by further configuration of the processing circuitry by instructions for performing the algorithms and/or operations described herein. The processor 202 may include, among other things, a clock, an arithmetic logic unit (ALU) and logic gates configured to support operation of the processing circuitry.

The communication interface 204 may be any means such as a device or circuitry embodied in either hardware or a combination of hardware and software that is configured to receive and/or transmit data, including media content in the form of video or image files, one or more audio tracks or the like. In this regard, the communication interface 204 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 illustrates an example interactive system containing a UE 102 and an associated content server 108. The content server 108 may deliver media content to UE 102 and the UE 102 may deliver user input to content server 108 using 5G interfaces to a 5GS. In some instances, a content server 108 may be configured to support interactive services requiring viewport-dependent streaming, such as XR services. Viewport-dependent streaming is typically implemented based on adaptive streaming schemes based on network status and pose information to adjust the quality to the available bitrate and user Field of View (FOV).

As depicted in FIG. 3, the transmission of new XR content can be triggered by transmission of pose and positional data stemming from 3 degrees of freedom (3DOF) tracking, 6 degrees of freedom (6DOF) tracking, and/or other XR sensors capable of communicating, such as via a network interface, such as a 5GS interface, the pose and position of the UE 102, or user captured input. In some embodiments, head and user movements (e.g., changes in pitch, yaw, roll, and coordinates) may be communicated to the content server through the communication network 100 in device update packets 110. Changes in the pose and position of the UE 102 and/or user input captured by the UE 102 may trigger the need to download the next portion of the 3D video. FIG. 3 depicts some of the operations that may be involved in generating and distributing new media content, for example, XR Media Generation, XR Viewport Rendering, 2D Media Encoding, XR Media Content Delivery, and other similar operations. Via a network interface, such as a 5GS interface, the content server may utilize the communication network 100 to transmit media content via media content update packets 112 or new media content transmission packets 120 if the contained data cannot be decoded based on previous video frames. Once all tiles in the FOV are transmitted to the UE 102, the tiles can be rendered to generate the 3D representation that is displayed to the user. FIG. 3 depicts operations of a particular embodiment that may be employed to display media content to the user. These operations may include, for example, XR Media Content Delivery, decoding using 2D Media Decoders, and XR Viewport Rendering.

FIG. 4 illustrates a timing diagram associated with receiving updated content in response to a pose/position update and/or user input from a UE 102. The vertical line on the right side of the diagram represents transactions at the UE 102, while the middle line represents transactions occurring at the network processing node 106, and the left line represents transactions occurring at the content server 108. The progression downward along the lines represents the passage of time, and the arrows passing between the lines (412, 414, 416, 418) represent the transmission of data between the UE 102, network processing node 106, and content server 108.

As depicted at point 402, the first operation in the sequence occurs when a UE 102 transmits a device update packet 110 from the UE 102 to a network processing node 106 as represented by the line 412. The device update packet 110 may include pose and position data of the UE 102 as well as user input and other similar data. In some instances, the device update packet 110 may include pose, position, or user data that necessitates an update in interactive content such as imagery or 3D video.

As depicted at point 404, the device update packet 110 is received at a network processing node 106. The uplink transmission time 420 represents the transmission delay incurred by the transmission of device update packets 110 between the UE 102 and the network processing node 106. If the uplink transmission time 420 was to exceed the one-way PDB defined in the 5QI specification for uplink, the packet would be considered lost and may be dropped. In some embodiments, the device update packets 110 will contain pose and position data related to the pose and position of the UE 102. In other embodiments, the device update packets 110 may contain data representing user input. In some embodiments, the uplink stream comprised of the device update packets 110 may generate a light data flow, for example, a few kilobits per second of data. In such embodiments, the device update packets 110 will likely reach the network processing node 106 below the PDB time allotted by the 5QI documentation. If the device update packet's 110 uplink transmission time 420 is greater than the PDB for the given transmission type, the device update packets 110 may be discarded.

As represented by 414, the device update packet 110 is further transmitted to the content server 108 where it is received by the content server 108 at point 406. The content server 108 may generate and transmit media content update packets 112 based upon the content of the device update packets 110 to the network processing node 106, as represented by line 416. As further described in FIG. 1, in some embodiments, the transmission of new media content may be triggered by head and user movements (e.g., changes in pitch, yaw, roll, and coordinates of the UE 102), the need to download the next portion of the 3D video, and/or by user input captured by the UE 102. In such embodiments, the downlink stream comprised of the new media content transmission packet 120 may generate a heavy data flow, for example, many megabits per second of data. In addition, in some embodiments, the downlink stream may be comprised of media content update packet 112 representing encoded video data. Changes triggering the transmission of new media content in encoded video streams may require transmission of a reference frame, for example, an intra-frame coded video frame. Intra-frame coding may use lossy coding techniques that require only the information carried in the compressed frame for decoding. These intra-frame coded frames may be I-frames, according to some embodiments.

As depicted at point 408, the media content update packet 112 is received at the network processing node 106 and transmitted to the UE 102 for download and display as represented by line 418. The downlink transmission time 422 represents the transmission delay incurred by the transmitted media content update packet 112 between the network processing node 106 and the UE 102. If the downlink transmission time 422 were to exceed the one-way PDB for the given transmission type, the packet would be considered lost. In some embodiments, the media content update packet 112 may be interactive video content and other multimedia related to the device update packets 110 received from the UE 102. In some embodiments, the downlink stream comprised of the media content update packet 112 may generate a large amount of data, for example, many megabits per second of data. In such embodiments, the media content update packet 112 may reach the UE 102 after expiration of the one-way PDB. If the media content update packet 112 downlink transmission time 422 is greater than the PDB for the given transmission type, the media content update packet 112 will be lost, regardless of whether the round-trip transmission time 424 representing the delay from the time of transmission of the initial device update packets 110 arrives at the UE 102 within the window of the combined one-way PDB s.

FIG. 5 depicts a representation of an encoded video data stream 500. In some embodiments, the media content update packet 112 may comprise an encoded video data stream 500 containing reference video frames 502 and non-reference video frames 504. The transmission of a reference video frame 502 may be dictated by a change in pose or position of a UE 102 and communicated via a device update packet 110. The transmission of a non-reference video frame 504 is dependent on previously transmitted frames and thus may only be transmitted after an initial reference video frame 502 has been transmitted. In some embodiments, a reference video frame 502 may be comprised of an intra-frame coded video frame, an I-frame, or other similar frame requiring only the information carried in the compressed frame for decoding. In some embodiments, a non-reference video frame 504 may be comprised of an inter-frame coded video frame, a P-frame, a B-frame, or other similar frame utilizing information carried in neighboring frames for decoding.

In some embodiments, the network processing node 106 may be configured to recognize a change in pose or position information based on the transmission pattern of the media content update packet 112 stream. For example, transmission of a new pose, a new position, or user input information from an interactive UE 102 displaying encoded video may require the content server 108 to render a new portion of the space visible to the user. The new rendered video requires a refresh of the input of the video decoding algorithm, since the new portion of the visible space cannot be decoded from previous frames. Therefore, after a pose or position change, the content server 108 may send a new Group of Pictures (GOP), which may start with a reference video frame 502 or, in some embodiments, an I-frame. A network processing node 106 may analyze media content update packets 112 to determine if a reference video frame 502 has been sent. Once a reference video frame 502 has been identified using the header information of the media content update packet 112, a network processing node 106 may identify the associated group of device update packets 110 that likely triggered the content update and estimate an elapsed uplink transmission time 420 for the associated transaction. In some embodiments, a network processing node 106 may identify a list of device update packets 110 likely to have triggered the transmission of new content by identifying all device update packets 110 between the identified reference video frame 502 and the most recently transmitted non-reference video frame 504 destined for the same UE 102. The network processing node 106 may utilize this plurality of device update packets 506 to determine an incurred latency as an approximate for the uplink transmission time 420.

Referring now to FIG. 6, an example flowchart 600 is illustrated representing an embodiment for a process of determining the delay budget for a downlink transmission of an identified new media content transmission packet 120. It is to be appreciated that the embodiment depicted and described below is presented as an example embodiment and other embodiments are not limited to the process illustrated herein or otherwise described below.

As shown in block 602, the apparatus that embodies the network processing node 106 may include means, such as the processor 202 or the like, for selecting an uplink device update packet 110 from the plurality of device update packets 506 and determining the uplink transmission delay (or latency) of the device update packet 110 ($T_{DUP}(0)$). In some embodiments, this value may be initially assigned as the estimated uplink transmission time 420 ($T_{UL}$). In some embodiments, i may be initialized to 2.

As shown in block 604, the apparatus that embodies the network processing node 106 may include means, such as the processor 202 or the like, for checking the latency of the i-th device update packet 110 selected from the plurality of device update packets 506 ($T_{DUP}(i)$).

As shown in block 606, the apparatus that embodies the network processing node 106 may include means, such as the processor 202 or the like, for comparing the latency of the i-th device update packet 110 ($T_{DUP}(i)$) to the estimated uplink transmission time 420 ($T_{UL}$). If the latency of the i-th device update packet 110 ($T_{DUP}(i)$) is greater than the previously assigned estimated uplink transmission time 420 ($T_{UL}$), then the latency of the i-th device update packet 110 ($T_{DUP}(i)$) is assigned to be the new estimated uplink transmission time 420 ($T_{UL}$) in block 608. If the latency of the i-th device update packet 110 ($T_{DUP}(i)$) is not greater than the previously assigned estimated uplink transmission time 420 ($T_{UL}$) then the estimated uplink transmission time 420 ($T_{UL}$) remains as assigned.

As shown in block 610, the apparatus that embodies the network processing node 106 may include means, such as the processor 202 or the like, for determining if the latency of all of the device update packets 110 of the plurality of device update packets 506 have been checked, by comparing the modulo of i and N+1 to zero, where N is the number of device update packets 110 in the plurality of device update packets 506. If the modulo value is zero, all device update packets 110 in the plurality of device update packets 506 have been checked and the process 600 continues at operation 612. If the modulo value is not equal to zero, the value i is incremented and the process continues at operation 604.

As shown in block 612, the apparatus that embodies the network processing node 106 may include means, such as the processor 202 or the like, for determining the remaining downlink transmission time 422 for the new media content transmission packet 120 ($NCTP_{DL}$). Once the latencies of all of the device update packets 110 in the plurality of device update packets 506 have been checked, the estimated uplink transmission time 420 ($T_{UL}$) will now represent the maximum uplink transmission time 420 of the plurality of device update packets 506. The remaining downlink transmission time 422 for the new media content transmission packet 120 ($NCTP_{DL}$) may be calculated by subtracting the estimated uplink transmission time 420 ($T_{UL}$) from the two-way delay budget (TWDB) for the transmission type.

Referring now to FIG. 7, an example flowchart 700 is illustrated representing an example embodiment for a process modifying the transmission of a new media content transmission packet 120 based on the optional use of a two-way delay budget. It is to be appreciated that the embodiment depicted and described below is presented as an example embodiment and other embodiments are not limited to the process illustrated herein or otherwise described below.

As shown in block 702, the apparatus that embodies the network processing node 106 may include means, such as the processor 202 or the like, for receiving a new media content transmission packet 120, such as from the content server.

As shown in block 704, the apparatus that embodies the network processing node 106 may include means, such as the processor 202 or the like, for determining whether the pre-defined two-way delay budget or whether the standard one-way delay budget will be utilized in determining the modification transmission of the new media content transmission packet 120. This process is described in further detail in FIG. 8. If the network processing node 106 determines the two-way delay budget will be used, the process 700 will continue at operation 708. If the network processing node 106 determines the standard one-way delay budget will be used, the process 700 will continue at operation 706.

As shown in block 706, the apparatus that embodies the network processing node 106 may include means, such as the processor 202 or the like, for comparing the sum of the queueing time and the estimated downlink transmission latency ($T_{DL}(i)$) for the new media content transmission packet 120 to the one-way downlink PDB ($T_{DL\text{-}PDB}$) for the particular transmission. An estimated downlink transmission latency may be any estimated measure representative of the delay that may be incurred between the network processing node 106 and display on the UE 102. In some embodiments, the estimated downlink transmission latency may include the sum of the delay due to time spent in the transmission queue and the estimated delay due to time spent enroute from the network processing node 106 and the UE 102. If the estimated downlink transmission latency is less than or equal to the one-way downlink PDB, the new media content transmission packet 120 will be transmitted to the UE at operation 710. If the estimated downlink transmission latency ($T_{DL}(i)$) is greater than the one-way downlink PDB ($T_{DL\text{-}PDB}$) the new media content transmission packet 120 will be dropped at operation 712.

As shown in block 708, the apparatus that embodies the network processing node 106 may include means, such as the processor 202 or the like, for comparing the estimated downlink transmission latency ($T_{DL}(i)$) to the two-way delay budget for the given transmission type and the estimated uplink transmission time 420 ($T_{UL}$) determined from the plurality of device update packets 506. If the estimated downlink transmission latency is less than or equal to the two-way delay budget minus the estimated uplink transmission time 420, the new media content transmission packet 120 will be transmitted to the UE at operation 710. If the estimated downlink transmission latency ($T_{DL}(i)$) is greater than the two-way delay budget minus the estimated uplink transmission time 420, the new media content transmission packet 120 will be dropped at operation 712.

Referring now to FIG. 8, an example flowchart 800 is illustrated that is implemented, for example, by a network processing node 106 and, more generally, an apparatus that embodies the network processing node to determine a round-trip transmission time 424 for a media content update packet 112 and determine if the transmission may need to be modified.

As shown in block 802, the apparatus that embodies the network processing node 106 may include means, such as the processor 202 or the like, for determining whether the pre-defined two-way delay budget will be utilized to modify transmission of a new media content transmission packet 120. A network processing node 106 may use any means to determine whether to use a two-way delay budget when evaluating the quality of service as it relates to a particular packet; as opposed to using a one-way packet delay budget. For example, a network processing node 106, such as the processor 202, may consider utilizing a two-way delay budget, based on the 5QI classification of a downlink data packet. In other embodiments, a network processing node 106, such as the processor 202, may consider the type of data, the data encoding, the size of the data packet, the source of the data, the protocol, and/or similar data characteristics when determining if a two-way delay budget should be used. In some embodiments, the media content update packet 112 may contain an indicator notifying the network processing node 106 to use a two-way delay budget when evaluating the transmission of the media content update packet 112. In some embodiments, if the network processing node 106 determines a two-way delay budget will not be used, the network processing node 106, such as the processor 202, may utilize a one-way packet delay budget to evaluate the packet transmission.

As mentioned above, in some embodiments, the two-way delay budget parameter may be defined explicitly as part of the 5QI description as an additional parameter to the QoS parameters. In some embodiments, the two-way delay budget may be defined implicitly as a note in the 5QI description indicating that the two-way delay budget is the sum of the packet delay budget of the 5QIs selected for uplink and downlink QoS flows. For example, if the 5GS selects 5QI as 88 (packet delay budget is 10 milliseconds) for the uplink device update packet 110 and 5QI as 89 (packet delay budget is 15 milliseconds) for the downlink new media content transmission packet 120, the resulting two-way delay budget may be the sum of the uplink PDB and the downlink PDB, or 25 milliseconds.

In addition to adding the two-delay budget to the 5QI description, the calculation of peak error rate (PER) may be changed in some embodiments. When a two-way delay budget is not utilized, a packet which is delayed more than the one-way PDB is counted as lost and included in the PER unless the data burst is exceeding the maximum data burst volume (MDBV) within the period of PDB or the QoS flow is exceeding the guaranteed flow bit rate (GFBR). In some embodiments utilizing a two-way delay budget, as long as uplink device update packets 110 and downlink new media content transmission packets 120 are delivered within the two-way delay budget, the corresponding device update packet 110 and new media content transmission packet are not counted as lost and thus not included in the PER.

As shown in block 804, the apparatus that embodies the network processing node 106 may include means, such as the processor 202, or the like for determining a plurality of device update packets 506 associated with the new media content transmission packet 120. In some embodiments, a new media content transmission packet 120 may contain new audio, video, or other multimedia content intended to be provided to a UE 102 running an interactive service. In some embodiments, transmission of a new pose, position, or user input information from an interactive UE 102 displaying encoded video may require the content server 108 to render a new portion of the space visible to the user of the UE 102. The new rendered video requires a refresh of the input of the video decoding algorithm, since the new portion of the visible space cannot be decoded from previous frames. Therefore, after a pose or position change, the content server 108 may send a new Group of Pictures (GOP), which starts with a reference video frame 502 or I-frame. A network processing node 106, such as the processor 202, may analyze packet information associated with a media content update packet 112 to determine if a new media content transmission packet 120 has been sent. Once a new media content transmission packet 120 has been identified using the header or other packet information associated with the new media content transmission packet 120, a network processing node 106, such as the processor 202, may identify the associated group of device update packets 110 that includes the device update packets 110 that triggered the content update. In some embodiments, a network processing node 106, such as the processor 202, may identify a list of device update packets 110 likely to have triggered the transmission of new content by identifying all device update packets 110 transmitted before the identified new media content transmission packet 120 or reference video frame 502 and after the most recently transmitted non-reference video frame 504 associated with the same UE 102.

As shown in block 806, the apparatus that embodies the network processing node 106 may include means, such as the processor 202 or the like, for determining an estimated elapsed uplink transmission time 420 based on respective transmit times for the plurality of device update packets 506. The network processing node 106, such as the processor 202, may utilize the previously determined plurality of device update packets 506 to determine an incurred latency as an approximation for the uplink transmission time 420. In some embodiments, the network processing node 106 may determine a function of respective elapsed uplink transmission times 420 for the plurality of device update packets 506 as an estimate for the elapsed uplink transmission time 420. In some embodiments, the function of elapsed uplink transmission times 420 may determine the longest uplink transmission time 420 from the plurality of device update packets 506. This type of calculation represents the worst case scenario for elapsed uplink transmission time 420 and is illustrated in FIG. 6. In other embodiments, the function of elapsed uplink transmission times 420 may calculate the average elapsed time for the plurality of device update packets 506. Still, in other embodiments, the function of respective elapsed uplink transmission times 420 for estimated the elapsed uplink transmission time may be determined by calculating the upper bound of the confidence interval of the elapsed time for the plurality of device update packets 506. In addition, other similar calculations may be computed by the processor 202 to determine an estimate of the elapsed uplink transmission time 420.

As shown in block 808, the apparatus that embodies the network processing node 106 may include means, such as the processor 202 or the like, for determining an estimated remaining downlink transmission time 422 based on an estimate of the time required to transmit the new media content transmission packet 120 to an interactive device. In some embodiments, the network processing node 106, such as the processor 202, may be configured to determine a DL transmission time for the new media content transmission packet 120. In some embodiments, the estimated remaining downlink transmission time 422 may include the queueing time which may cause a delay in the transmission of the new media content transmission packet 120 in combination with the estimated DL transmission time.

As shown in block 810, the apparatus that embodies the network processing node 106 may include means, such as the processor 202 or the like, for comparing the estimated elapsed uplink transmission time 420 and the estimated remaining downlink transmission time 422 with a predefined two-way delay budget. In some embodiments, the network processing node 106, such as the processor 202, may combine the estimated elapsed uplink transmission time 420 and the estimated remaining downlink transmission time 422 to produce an estimated round-trip transmission time 424 between the transmission of a device update packet 110 containing a pose or position change and a received new media content transmission packet 120 providing the new content for the pose or position change. This total estimated round-trip transmission time 424 may be compared to a pre-determined threshold or two-way delay budget. The pre-determined two-way delay budget may be a part of the 5QI standard, may be determined from existing values in the 5QI standard, such as the packet delay budget (PDB), or may be determined through similar standards or calculations. Determining an estimated round trip transmission time and comparing the estimated time to a two-way delay budget allows greater flexibility for interactive services in providing an immersive experience that meets quality of service guidelines. For example, an interactive service may contain small amounts of data in the device update packets 110 when compared with the media content update packet 112. By requiring responsive data to be returned within a round-trip, two-way delay budget instead of being subjected to a one-way packet delay budget, interactive services may be better equipped to meet quality of service requirements.

As shown in block 812, the apparatus that embodies the network processing node 106 may include means, such as the processor 202, communication interface 204, or the like, for modifying the transmission of the new media content transmission packet based on the comparison to the two-way delay budget. In some embodiments, the network processing node 106, such as the processor 202, may be configured to discard and/or otherwise remove from the transmission queue a media content update packet 112 if the network processing node 106 determines that the estimated round-trip transmission time 424 is greater than the pre-determined two-way delay budget. However, if the estimated round-trip transmission time 424 is less than the pre-determined two-way delay budget, the network processing node 106, such as the processor 202, the communication interface 206 or the like, may transmit the media content update packet 112 to the UE 102.

In another embodiment, a method, apparatus and computer program product are provided that are embodied or performed by the user equipment. In this regard, the apparatus includes means, such as the processor, the communication interface or the like, for transmitting a device update packet requiring transmission of new media content. The apparatus of this example embodiment also includes means, such as the processor, the communication interface or the like, for receiving a new media content transmission packet in conformance with a pre-defined two-way delay budget.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a basketball arena environment, however, one skilled in the art may recognize that such principles may be applied to a hockey game, a soccer match, a football game, a concert, or in any other arena environment. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A method comprising:
   determining a plurality of device update packets associated with an Extended Reality (XR) media content transmission packet, wherein the XR media content transmission packet comprises a compressed video stream comprising one or more reference video frames and one or more non-reference video frames;
   determining an estimated elapsed uplink transmission time based on respective transmit times required for an interactive XR device to transmit respective device update packets of the plurality of device update packets to a network processing node;
   determining an estimated remaining downlink transmission time for the XR media content transmission packet, based on an estimate of the time required for the network processing node to transmit the XR media content transmission packet to the interactive XR device;
   comparing an estimated round trip transmission time comprising a sum of the estimated elapsed uplink transmission time and the estimated remaining downlink transmission time with a pre-defined two-way delay budget for the interactive XR device; and
   in an instance in which the estimated round trip transmission time is greater than the pre-defined two-way delay budget for the interactive XR device, modifying transmission of the XR media content transmission packet to reduce the sum of the estimated elapsed uplink transmission time and the estimated remaining downlink transmission time to be less than or equal to the pre-defined two-way delay budget for the interactive XR device.

2. The method of claim 1, wherein identifying the XR media content transmission packet further comprises identifying a reference video frame.

3. The method of claim 2, wherein determining the plurality of device update packets associated with the XR media content transmission packet further comprises identifying all device update packets received after a most recent non-reference video frame was received and before the reference video frame.

4. The method of claim 3, wherein determining the estimated elapsed uplink transmission time further comprises determining an elapsed uplink transmission time required for transmitting the respective device update packets of the plurality of device update packets to a media content server and defining the estimated elapsed uplink transmission time based on the maximum elapsed uplink transmission time for respective device update packets of the plurality of device update packets.

5. The method of claim 3, wherein determining the estimated elapsed uplink transmission time further comprises determining a function of respective elapsed uplink transmission times for respective device update packets of the plurality of device update packets.

6. The method of claim 5, wherein determining the function of respective elapsed uplink transmission times for respective device update packets of the plurality of device update packets comprises computing the average or the upper bound of the confidence interval of respective elapsed uplink transmission times for the plurality of device update packets.

7. The method of claim 1, further comprising:
determining whether the pre-defined two-way delay budget will be utilized to modify transmission of the XR media content transmission packet.

8. The method of claim 1, wherein modifying transmission of the XR media content transmission packet further comprises discarding the XR media content transmission packet.

9. An apparatus comprising:
at least one processor; and
at least one memory storing instructions that, when executed by the at least one processor, cause the apparatus to perform at least:
determining a plurality of device update packets associated with an Extended Reality (XR) media content transmission packet, wherein the XR media content transmission packet comprises a compressed video stream comprising one or more reference video frames and one or more non-reference video frames;
determining an estimated elapsed uplink transmission time based on respective transmit times required for an interactive XR device to transmit respective device update packets of the plurality of device update packets to a network processing node;
determining an estimated remaining downlink transmission time for the XR media content transmission packet based on an estimate of the time required for the network processing node to transmit the XR media content transmission packet to the interactive XR device;
comparing an estimated round trip transmission time comprising a sum of the estimated elapsed uplink transmission time and the estimated remaining downlink transmission time with a pre-defined two-way delay budget for the interactive XR device; and
in an instance in which the estimated round trip transmission time is greater than the pre-defined two-way delay budget for the interactive XR device, modifying transmission of the XR media content transmission packet to reduce the sum of the estimated elapsed uplink transmission time and the estimated remaining downlink transmission time to be less than or equal to the pre-defined two-way delay budget for the interactive XR device.

10. The apparatus of claim 9, wherein the instructions stored on the at least one memory, when executed by the at least one processor, further cause the apparatus to identify the XR media content transmission packet by identifying a reference video frame.

11. The apparatus of claim 10, wherein the instructions stored on the at least one memory, when executed by the at least one processor, further cause the apparatus to perform:
determining the plurality of device update packets associated with the XR media content transmission packet by identifying all device update packets received after a most recent non-reference video frame was received and before the reference video frame.

12. The apparatus of claim 11, wherein the instructions stored on the at least one memory, when executed by the at least one processor, further cause the apparatus to perform:
determining the estimated elapsed uplink transmission time by determining an elapsed uplink transmission time required for transmitting the respective device update packets of the plurality of device update packets to a media content server and defining the estimated elapsed uplink transmission time based on the maximum elapsed uplink transmission time for respective device update packets of the plurality of device update packets.

13. The apparatus of claim 11, wherein the instructions stored on the at least one memory, when executed by the at least one processor, further cause the apparatus to perform:
determining the estimated elapsed uplink transmission time by determining an average of a confidence interval of respective elapsed uplink transmission times for respective device update packets of the plurality of device update packets.

14. The apparatus of claim 9, wherein the instructions stored on the at least one memory, when executed by the at least one processor, further cause the apparatus to perform at least:
determining whether the pre-defined two-way delay budget will be utilized to modify transmission of the XR media content transmission packet.

15. The apparatus of claim 9, wherein the instructions stored on the at least one memory, when executed by the at least one processor, further cause the apparatus to perform said modifying transmission of the XR media content transmission packet further comprises:
discarding the XR media content transmission packet.

16. A non-transitory computer-readable storage medium having program code portions stored thereon, the program code portions being configured, upon execution by one or more processors, to cause an apparatus to perform at least:
determining a plurality of device update packets associated with an Extended Reality (XR) media content transmission packet, wherein the XR media content transmission packet comprises a compressed video stream comprising one or more reference video frames and one or more non-reference video frames;
determining an estimated elapsed uplink transmission time based on respective transmit times required for an interactive XR device to transmit respective device update packets of the plurality of device update packets to a network processing node;
determining an estimated remaining downlink transmission time for the XR media content transmission packet based on an estimate of the time required for the network processing node to transmit the XR media content transmission packet to the interactive XR device;
comparing an estimated round trip transmission time comprising a sum of the estimated elapsed uplink transmission time and the estimated remaining downlink transmission time with a pre-defined two-way delay budget for the interactive XR device; and
in an instance in which the estimated round trip transmission time is greater than the pre-defined two-way delay budget for the interactive XR device, modifying transmission of the XR media content transmission packet to reduce the sum of the estimated elapsed uplink transmission time and the estimated remaining downlink transmission time to be less than or equal to the pre-defined two-way delay budget for the interactive XR device.

17. The non-transitory computer-readable storage medium of claim 16, wherein the program code portions configured, upon execution by the at least one processor, to cause the apparatus to perform said identifying the XR media content transmission packet further comprise program code portions configured, upon execution by the at least one processor, to cause the apparatus to perform identifying a reference video frame.

18. The non-transitory computer-readable storage medium of claim 17, wherein the program code portions configured, upon execution by the at least one processor, to cause the apparatus to perform said determining the plurality of device update packets associated with the XR media content transmission packet further comprise program code portions configured, upon execution by the at least one processor, to cause the apparatus to perform identifying all device update packets received after a most recent non-reference video frame was received and before the reference video frame.

19. The non-transitory computer-readable storage medium of claim 18, wherein the program code portions configured, upon execution by the at least one processor, to cause the apparatus to perform said determining the estimated elapsed uplink transmission time further comprise program code portions configured, upon execution by the at least one processor, to cause the apparatus to perform determining the elapsed uplink transmission time required for transmitting the respective device update packets of the plurality of device update packets and program code portions configured, upon execution by the at least one processor, to cause the apparatus to perform defining the estimated elapsed uplink transmission time based on the maximum elapsed uplink transmission time for respective device update packets of the plurality of device update packets.

20. The non-transitory computer-readable storage medium of claim 18, wherein the program code portions configured, upon execution by at least one processor, to cause the apparatus to perform said determining the estimated elapsed uplink transmission time further comprise program code portions configured, upon execution by the at least one processor, to cause the apparatus to perform determining an average of a confidence interval of respective elapsed uplink transmission times for respective device update packets of the plurality of device update packets.

21. The non-transitory computer-readable storage medium of claim 16, further comprising program code portions configured, when executed by the at least one processor, to cause the apparatus to perform at least:
determining whether the pre-defined two-way delay budget will be utilized to modify transmission of the XR media content transmission packet.

22. The non-transitory computer-readable storage medium of claim 16, wherein the program code portions configured to cause the apparatus to perform said modifying transmission of the XR media content transmission packet further comprise program code portions configured, when executed by the at least one processor, to cause the apparatus to perform:
discarding the XR media content transmission packet.

* * * * *